United States Patent [19]
Leff et al.

[11] Patent Number: 5,910,009
[45] Date of Patent: Jun. 8, 1999

[54] COMMUNICATION AID USING MULTIPLE MEMBRANE SWITCHES

[76] Inventors: Ruth B. Leff; Aaron N. Leff, both of 6589 N. Crestwood Dr., Milwaukee, Wis. 53209

[21] Appl. No.: 08/918,066

[22] Filed: Aug. 25, 1997

[51] Int. Cl.$^6$ .................................................. G09B 5/00
[52] U.S. Cl. ........................... 434/322; 434/236; 434/237
[58] Field of Search .................................. 434/236–238, 434/317, 322, 323

[56] References Cited

U.S. PATENT DOCUMENTS

| | | | |
|---|---|---|---|
| 3,748,750 | 7/1973 | Viemeister | 434/236 |
| 4,761,633 | 8/1988 | Leff et al. | |
| 4,900,256 | 2/1990 | Dara-Abrams | 434/236 |
| 4,915,632 | 4/1990 | Leff et al. | |
| 4,954,083 | 9/1990 | Leff et al. | |
| 5,088,928 | 2/1992 | Chan | 434/339 |
| 5,217,378 | 6/1993 | Donovan | 434/116 |
| 5,356,296 | 10/1994 | Pierce et al. | 434/317 |
| 5,382,791 | 1/1995 | Leff et al. | |
| 5,474,457 | 12/1995 | Bromley | 434/311 |
| 5,636,995 | 6/1997 | Sharpe et al. | 434/317 |
| 5,746,602 | 5/1998 | Kikinis | 434/169 |

*Primary Examiner*—Glenn E. Richman
*Attorney, Agent, or Firm*—Andrus, Sceales, Starke & Sawall

[57] ABSTRACT

A communication aid for helping people with severe communication problems to express their needs or thoughts to others. The communication aid includes a case on which a touch pad contains series of mode selection switches and a plurality of activation switches. An overlay sheet is mounted on the touch pad and includes at least one mode symbol illustrating a general category of need, and a plurality of message symbols, each illustrating a specific need falling within the category. The mode symbols corresponding in location to the mode selection switches and the message symbols corresponding in location to the activation switches. The communication aid also incorporates a memory device for storing a plurality of audio messages, each corresponding to one of the message symbols. When a mode selection switch and on of the activation switches are depressed, a sound message associated with the depressed activation switch is generated.

20 Claims, 6 Drawing Sheets

COMMUNICATION AID USING MULTIPLE MEMBRANE SWITCHES

BACKGROUND OF THE INVENTION

Disabled or handicapped persons, such as those being unable to speak, oftentimes have great difficulty communicating their basic needs to others. In order to aid a disabled person in communicating his or her basic thoughts, needs, or wants, various types of communication aids have been developed in the past. Devices of this type have been helpful for people with communication difficulties, such as aphasia, multiple sclerosis, neurological disorders, mental retardation, and other brain disorders, voice, hearing and visual difficulties, or post operative problems.

For example, U.S. Pat. No. 4,165,890 describes a communication aid utilizing a series of pictures or illustrations representing basic needs joined together on a ring. By selecting the proper illustration, the disabled person can communicate his or her needs or wants to others.

Another type of communication aid is shown in U.S. Pat. No. 4,761,633, which has particular use for disabled persons who have movement of their arms or legs but are unable to verbally communicate. In this device, a pointer is mounted for rotation on a generally flat surface of a housing and a series of pictures or illustrations, representing basic needs, are positioned on the housing surface. By depressing a push-button on the housing, the pointer is rotated and brought into registry with one of the illustrations on the housing to represent the need of the person.

U.S. Pat. No. 4,954,083 shows another form of communication aid, utilized by a motionless person also unable to verbally communicate. The disclosed communication aid is a device in which a series of pictures or illustrations representing possible needs of the person are mounted on a transparent board around a center hole or opening. An attendant, who is holding the board and looking through the opening, can follow the eye movement of the person to one of the illustrations on the board to thereby determine the specific need of the person.

While the above-identified communication aids are effective in relaying the basic needs of a person in a visual manner, these communication aids provide no audio output related to the need of the handicapped person. For this reason, an attendant or nurse aiding the handicapped person must be in a position such that they can visually see the communication aid and determine the need of the person. Additionally, it has been found that a device which produces an audio message provides the handicapped person with a method of communication that increases self-sufficiency since the audio signal can be easily interpreted by anyone. Thus, a communication aid which provides a sound message corresponding to the need of a disabled or handicapped person would be particularly desirable.

SUMMARY OF THE INVENTION

The invention is directed to a communication aid that helps both children and adults who are non-verbal, or who cannot be understood by others, to express their thought, needs and wants. The communication aid, which plays pre-recorded sound messages corresponding to selected needs or wants, can be used in daily living activities to designate needs, such as, for example, meal selection, reading, recreation, TV selection, shopping, comfort, and the like.

The communication aid includes a case or cabinet having a flat support surface to which a touch pad is securely mounted. The touch pad of the communication aid includes a switch membrane that is divided into a series of switch areas, including a series of mode selection switches and a series of activation switches. Upon being depressed, each of the switch areas contained on the switch membrane sends an electronic signal to a microprocessor that controls the operation of the communication aid. An overlay sheet is inserted in a transparent pocket located over the switch area, and the overlay sheet has a mode symbol, such as a picture or words designating a category of need or subject matter. The mode symbol overlays one of the mode selection switches. The overlay sheet also includes a series of message symbols, such as pictures or words, representing certain specific activates falling within the designated category of need. Each of the message symbols is located over one of the activation switches on the cabinet. For example, the overlay sheet may include an illustration of an automobile as the mode symbol representing a general category of "transportation", and the sheet may also include a second series of illustrations of pictures representing message symbols, such as supermarket, zoo, church, etc. which fall within the designated category of "transportation".

The communication aid of the invention also includes several memory devices that store a plurality of sound messages. The microprocessor is programmed such that it is able to assign an address to each of the storage locations in the memory devices. A sound message corresponding to each message symbol contained on one of the overlay sheets is stored in a location in one of the memory devices. In the preferred embodiment of the invention, individual overlay sheets are provided for each of four separate categories of potential needs of the person. The microprocessor is programmed such that each of the sound messages is stored in a memory location having an address assigned by the microprocessor depending upon which mode selection switch and actuation switch have been depressed.

The sound messages corresponding to each of the message symbols on the overlay sheet are recorded by first selecting the desired category of need. Selecting the desired category of need is done by depressing one of the mode symbols contained on the overlay sheet. As the mode symbol is depressed, the underlying mode selection switch contained on the switch membrane is also depressed. When the mode selection switch is depressed, the switch membrane sends an electronic signal to the microprocessor.

After the category of need has been selected by depressing the appropriate mode selection switch, a record button is depressed and the message symbol for which the current sound message is being recorded is also held down. As the message symbol is depressed, the underlying activation switch in the switch membrane is also depressed. While the activation switch is being held down, the desired sound message for that particular message symbol is spoken into a microphone mounted to the case or cabinet. As the sound message is being spoken into the microphone, the microprocessor assigns the sound message to a particular address location in one of the memory devices. The address location is based on both the mode selection switch and activation switch which have been depressed prior to recording the sound message.

Once a sound message has been recorded for every message symbol in each category of need, the handicapped patient is able to depress the message symbol showing their particular need, which results in the sound message recorded for that symbol being played. In this manner, the communication aid of the invention allows the user to determine what the sound message will correspond to each of the message symbols. If the user wishes to later change the sound message recorded for a particular message symbol, the microprocessor is able to erase and record a new sound message in the memory address corresponding to the category of need and the particular message symbol.

In the preferred embodiment of the invention, each of the overlay sheets includes a single mode symbol and six message symbols. In an alternate embodiment of the invention, a complex overlay sheet is used which has four mode symbols and twenty-four message symbols.

Other objects and advantages of the invention will appear in the course of the following description.

DESCRIPTION OF THE DRAWINGS

The drawings illustrate the best mode presently contemplated of carrying out the invention.

In the drawings.

DESCRIPTION OF THE ILLUSTRATED EMBODIMENT

Figure 1:
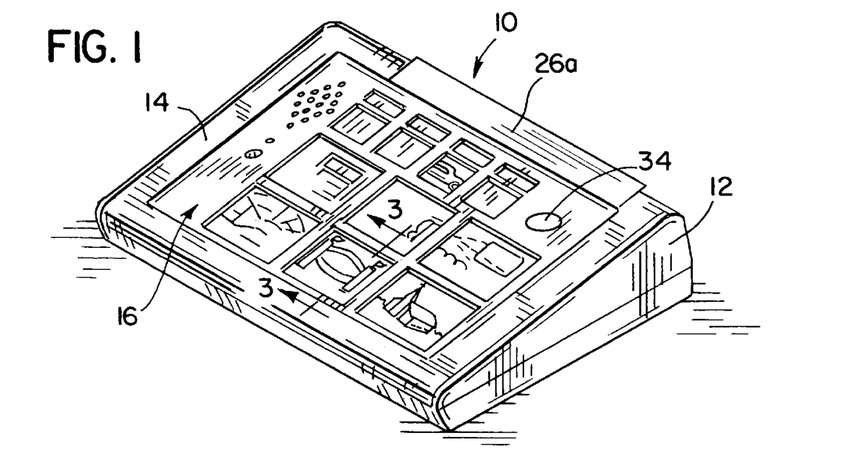
FIG. 1 is a perspective view of the communication aid of the invention.

Referring first to FIG. 1, the communication aid of the invention is there-shown and is generally referred to by reference numeral 10. The communication aid 10 includes a case or cabinet 12 having a flat, front support surface 14 that is slightly inclined to horizontal. In the preferred embodiment of the invention, the case 12 is a hollow structure which contains the electronic operating components to be described in detail below. The case 12 is preferably a two-piece, impact resistant, plastic structure joined together in a conventional manner.

Figures 2, 3:
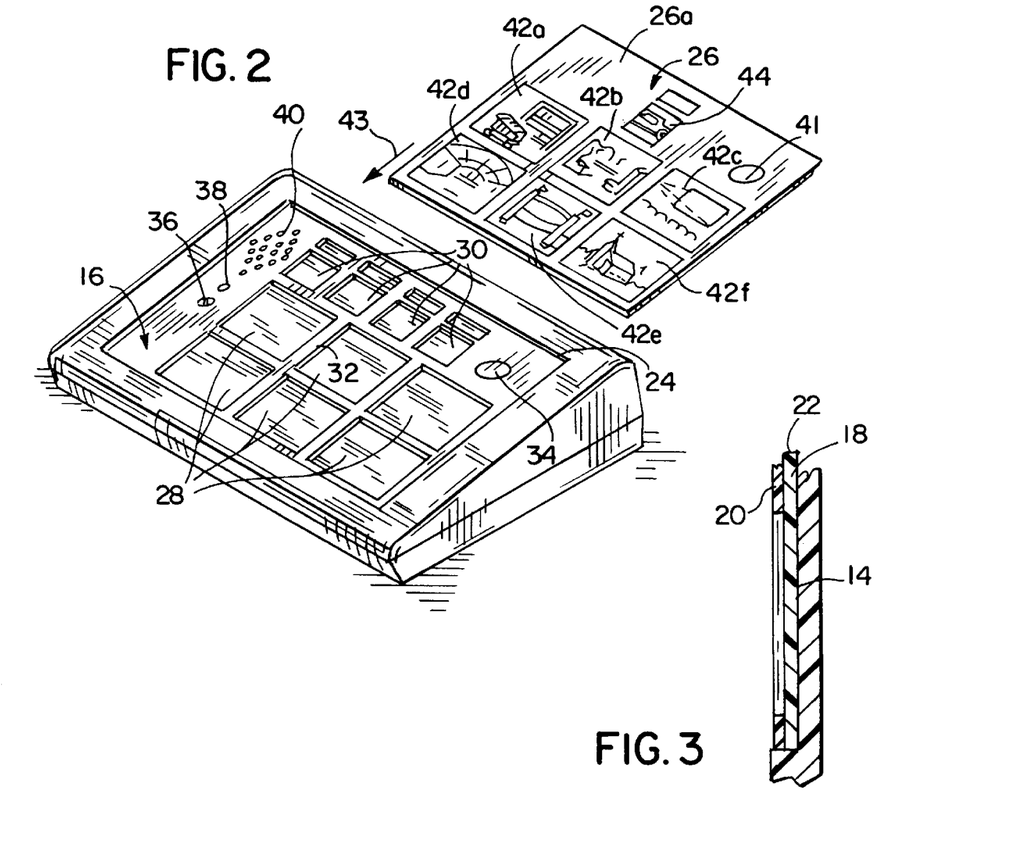
FIG. 2 is a perspective view of the communication aid of the invention showing the removability of the overlay sheet.
FIG. 3 is a fragmentary sectional view taken along line 3—3 of FIG. 1.

As can be seen in FIGS. 1 and 2, a touch pad 16 is securely attached to the front support surface 14 of the case 12. In the preferred embodiment of the invention, the back face 18 of the touch pad 16, FIG. 3, includes an adhesive coating such that the touch pad 16 can be securely adhered to the front support surface 14 of the case 12.

The touch pad 16 is a multi-layered construction consisting of a transparent cover sheet 20, preferably formed of a plastic material, and an underlying switch membrane 22. The switch membrane 22 is a commercially available product that includes a series of switch areas, each having a series of electrical coils which, upon being depressed, generate an electronic signal, such as disclosed in U.S. Pat. No. 5,403, 980. The cover sheet 20 and switch membrane 22 are joined to each other along three of the outer edges of the touch pad 16. The fourth edge 24 of the touch pad 16 does not contain a connection between the cover sheet 20 and the switch membrane 22 such that a pocket is formed between the cover sheet 20 and the switch membrane 22. An overlay sheet 26 can thus be inserted into the pocket between the cover sheet 20 and the switch membrane 22.

Referring now to FIG. 2, the switch membrane 22 is divided into a series of separate switch areas that can be depressed individually. The switch areas each generate a discrete electric signal from the touch pad 16 corresponding to which switch area has been depressed. The switch areas of the touch pad 16 include a series of activation switches 28 and a series of mode selection switches 30. The activation switches 28 and mode selection switches 30 are separately wired in the switch membrane 22 and are visually set apart by a grid 32 formed by the cover sheet 20.

In the preferred embodiment of the invention, shown in FIG. 2, the switch membrane 22 includes six switch areas designated as activation switches 28 and four switch areas designated as mode selection switches 30. Additionally, the touch pad 16 includes a switch area designated as the record button 34. The operation of the record button 34 in recording sound messages will be discussed in detail below.

The touch pad 16 further includes a microphone opening 36 and an indicator light 38. The microphone opening 36 provides access to a microphone (not shown) mounted to the support surface 14 of the case 12. Indicator light 38 is preferably an LED contained within the touch pad 16 that provides a visual indication that a sound message is being recorded, as will be discussed below. A perforated speaker covering 40 is also contained on the face of the touch pad 16 such that sound generated by a speaker (not shown) supported by the support surface 14 is able to pass through the touch pad 16.

Figure 4:
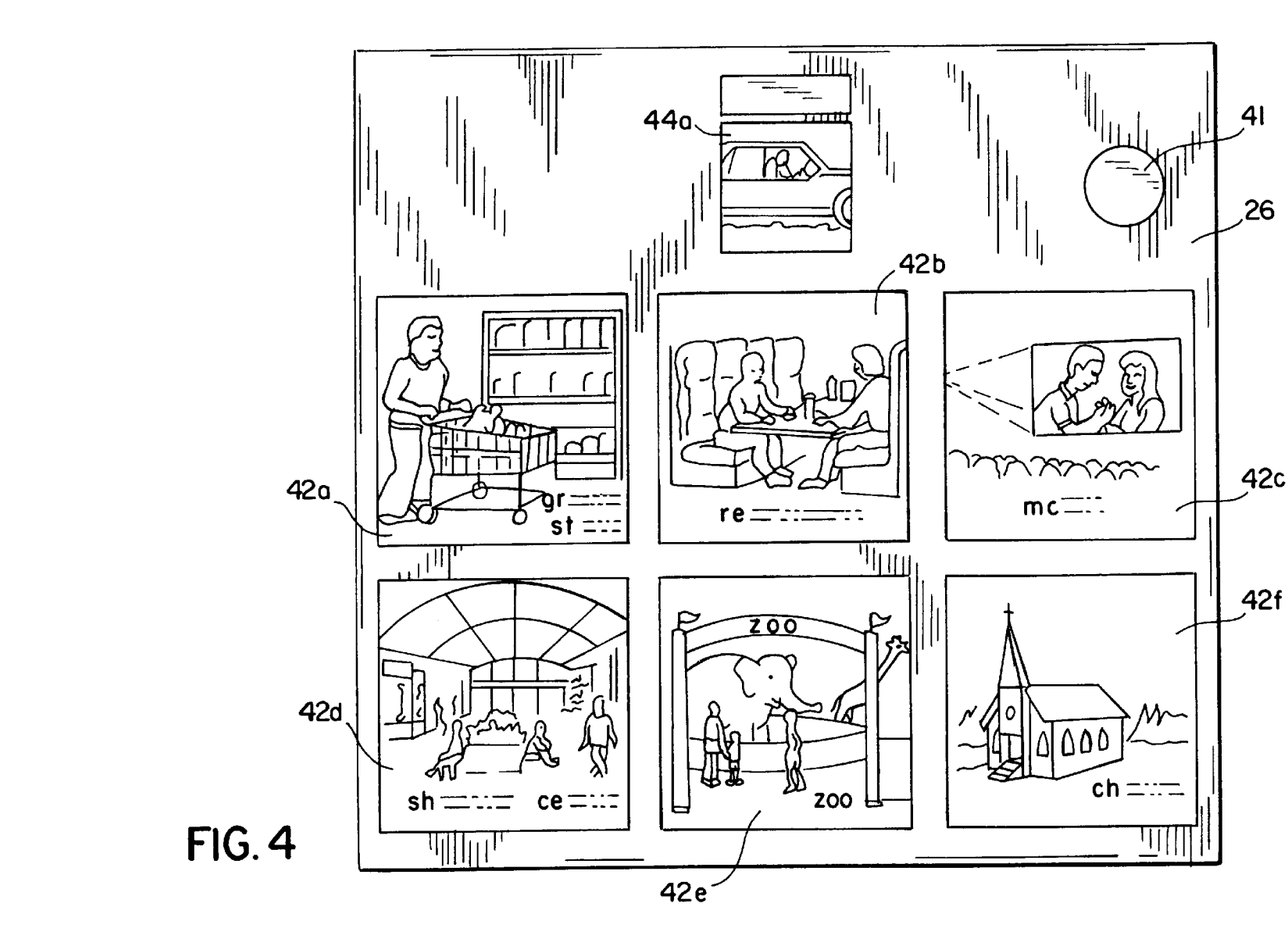
FIG. 4 is a graphical display of a first type of overlay sheet.

Referring now to FIG. 4, the overlay sheet 26 thereshown contains a series of printed symbols, and can be color-coded for easy identification. The symbols, which can take the form of pictures, illustrations or words, are divided into a series of message symbols 42a–f and a mode symbol 44a. The mode symbol 44a graphically represents a category or classification of related needs the disabled patient may have. For example, the mode symbol 44a could depict a category of needs such as emergency requests, food related requests, transportation related requests, and school related requests. The series of message symbols 42a–f represent the particular needs of the person related to the category depicted by the mode symbol 44a on the overlay sheet 26. In the embodiment shown in FIG. 4, the mode symbol 44a is an illustration depicting a category related to transportation needs of the handicapped person, and each of the individual message symbols 42a–f pictorially represent specific transportation needs. For example, the message symbol 42a is a symbol for the grocery store, symbol 42b for a restaurant, symbol 42c for a movie, symbol 42d for a shopping center, 42e for a zoo, and 42f for a church. Thus, the single overlay sheet 26 shown in FIG. 4 is able to represent six particular needs related to transportation. Additionally, the overlay sheet 26 contains a record button symbol 41.

When the overlay sheet 26 is inserted into the pocket created between the cover sheet 20 and switch membrane 22, as shown by arrow 43, the individual message symbols 42a–f are aligned above the individual activation switches 28 contained in switch membrane 22. The grid 32 formed by the cover sheet 20 visually separates the individual message symbols 42a–f when the overlay sheet 26 is positioned within the pocket of the touch pad 16. Likewise, the mode symbol 44a on the overlay sheet 26 is aligned above one of the mode selection switches 30 in the switch membrane 22. The grid 32 visually sets out the location for each of the mode selection switches 30 contained in the switch membrane 22.

As previously noted, each overlay sheet 26 can be color coded to facilitate identification. For example, the area of each sheet 26 bordering the message symbols 42 and mode symbols 44, as well as the upper edge 26a of the sheet, can be colored. In practice, the overlay sheet 26 relating to transportation needs can be colored red, the overlay sheet relating to food related requests can be colored green, etc. The color coding facilitates identification of the overlay sheets, and when the sheet is inserted into the pocket between cover sheet 20 and switch membrane 22, the upper colored edge 26a of the sheet will protrude from the pocket, again providing easy identification of the overlay sheet being used.

When the disabled person desires to relay a transportation related sound message, the person inserts the overlay sheet 26 containing the mode symbol 44a and depresses the mode symbol 44a, which results in the depression of the mode selection switch 30 located therebelow. The switch membrane 22 provides an electric signal corresponding to the mode selection switch 30 as will be discussed below. After depressing the mode symbol 44a, the disabled person can relay a specific sound message related to one of the message symbols 42a–f. When the person depresses one of the message symbols 42a–f, a corresponding activation switch 28 contained in the switch membrane 22 is also depressed. Thus, the switch membrane 22 generates an electric signal corresponding to the activation switch 28 depressed as will be fully discussed in detail below.

Figure 5:
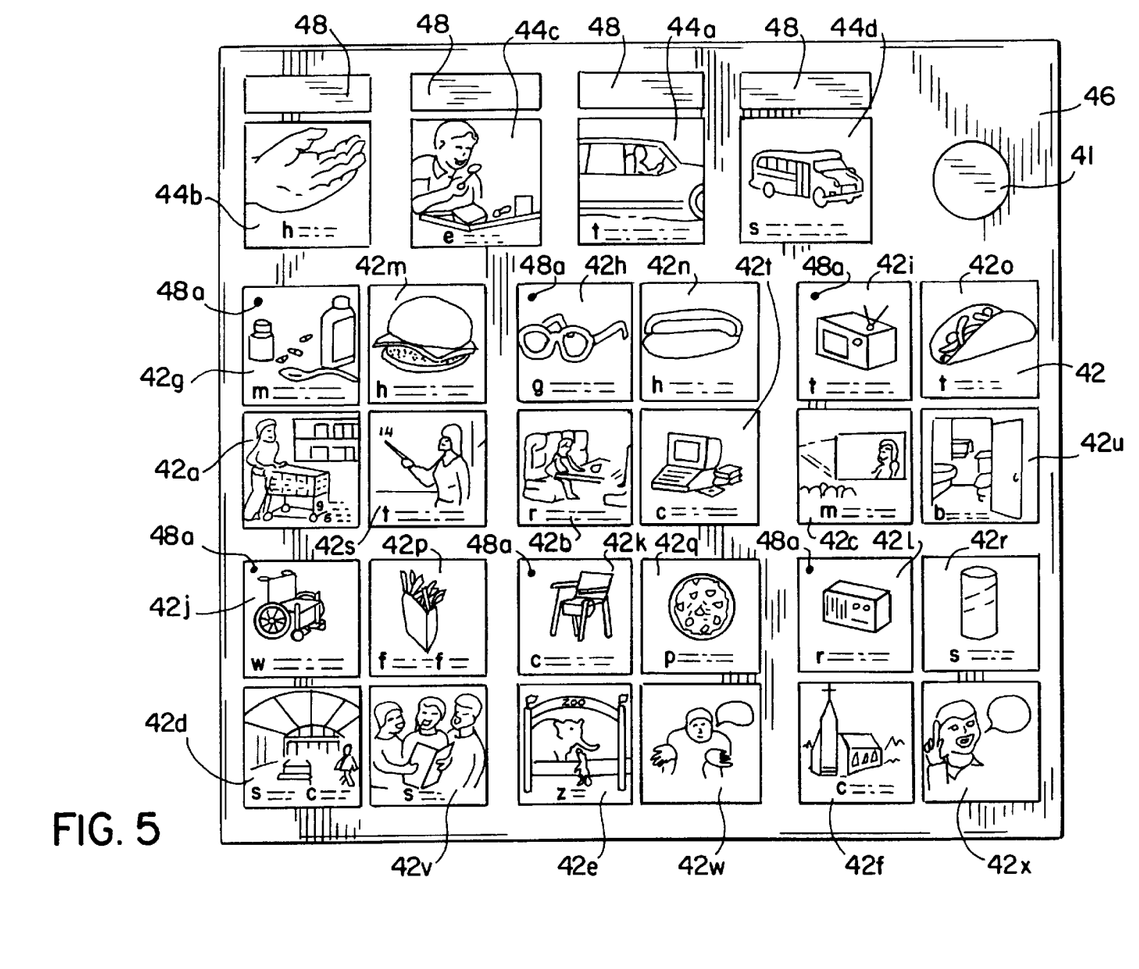
FIG. 5 is a graphical depiction of a second, complex type of overlay sheet.

Although an individual overlay sheet 26 is shown in FIG. 4 for the category of transportation-related needs, as depicted by the mode symbol 44a, an individual overlay sheet 26 is provided for the three other mode symbols 44b, 44c, 44d (FIG. 5). The mode symbols 44b–d are positioned on their own individual overlay sheet such that each symbol 44b–d corresponds to a different mode section switch 30 contained in the switch membrane 22. Although not shown, the additional overlay sheets would then contain a series of message symbols 42 depicting needs related to the category represented by the mode symbols 44b–d contained on the overlay sheet. In this manner, an individual overlay sheet corresponding to a category of need which the disabled person is anticipated to experience can be inserted into the touch pad 16.

Referring now to FIG. 5, a complex overlay sheet 46 is shown. The complex overlay sheet 46 is of the same size as the simple overlay 26 such that it can be inserted into the pocket between the cover sheet 20 and switch membrane 22. The complex overlay sheet 46 includes each of the plurality of mode symbols 44a–d, i.e. pictures or illustrations representing categories of need, printed on the single complex overlay sheet 46. Unlike the simple overlay sheets 26, the complex overlay sheet 46 includes four message symbols (for example, 42a, 42g, 42m, 42s) in the area set aside for a single message symbol 42a in the simple overlay sheet 26.

When the complex overlay sheet 46 is inserted into the pocket of the touch pad 16, four message symbols are positioned over each of the activation switches 28 contained in the switch membrane 22. Thus, a single complex overlay sheet 46 can replace the four individual overlay sheets 26. The message symbols or illustrations on overly sheet 46 are smaller in size than the message symbols on overlay sheet 26 and can be used by a person who does not have visual problems. When the complex overlay sheet 46 is used, a group of six message symbols correspond to each one of the mode symbols 44a–d. For example, message symbols 42a–f correspond to mode symbol 44a, message symbols 42g–l corresponds to the mode symbol 44b, message symbols 42m-6 correspond to mode symbol 44c and message symbols 44s–z correspond to mode symbol 44d.

In the preferred embodiment of the invention the mode symbols and the corresponding message symbols can be color coded to facilitate identification. In this regard, each of the mode symbols 44a–d includes an identification bar 48 place above it. Preferably, each of the identification bars 48 is a different color. Likewise, each of the message symbols 42a–z can be color-coded to correspond to the identification bar above the mode symbol 44a–d to which it belongs. For example, in the preferred embodiment the identification bar 48 above mode symbol 44b can be colored green, and each of the corresponding message symbols 42g–l can include a green colored dot or mark, shown by 48a in FIG. 5, indicating that the message symbols 42g–l correspond to the model symbol 44b. Similarly, the bar 48 above the mode symbol 44c could be given a second color, as for example red, and colored red dots or marks, not shown, could be applied to the corresponding message symbols 42m–r. Thus, the handicapped person can quickly and easily determine which mode symbol 44a–d must be depressed before the message symbol representing their need by simply matching colors between the message symbols and the identification bar 48 above the mode symbols 44a–d.

Figure 6:
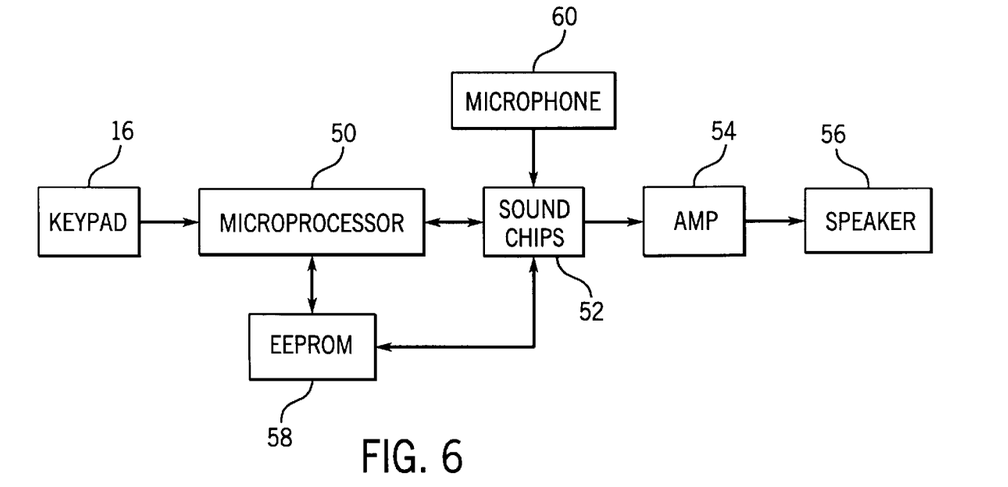
FIG. 6 is a block diagram showing the interconnection between the electronic components of the communication aid of the invention.

Referring now to FIG. 6, the electronic components required to record and play back the sound messages related to the message symbols 42 are thereshown. The communication aid 10 is controlled by a microprocessor 50. The microprocessor 50 is connected to the touch pad 16, such that the microprocessor 50 can receive electric signals from switch membrane 22 upon depression of any of the activation switches 28 and the mode selection switches 30. The microprocessor 50 is also connected to a series of memory devices, such as sound chips 52, which are used in recording and storing the series of sound messages corresponding to the message symbols 42, as will be discussed in greater detail below. Sound chips 52 are connected through an audio amplifier 54 to loudspeaker 56 such that the recorded sound messages stored in the sound chips 52 can be played. A memory storage unit, such as EEPROM 58 is connected to both the microprocessor 50 and sound chips 52. The EEPROM 58 allows the recorded sound messages in the sound chips 52 to be saved when power is removed from the microprocessor 50. A microphone 60 is connected to the sound chips 52 such that sound messages can be recorded in the sound chips 52 after the record button 34 has been depressed.

Figure 7A:
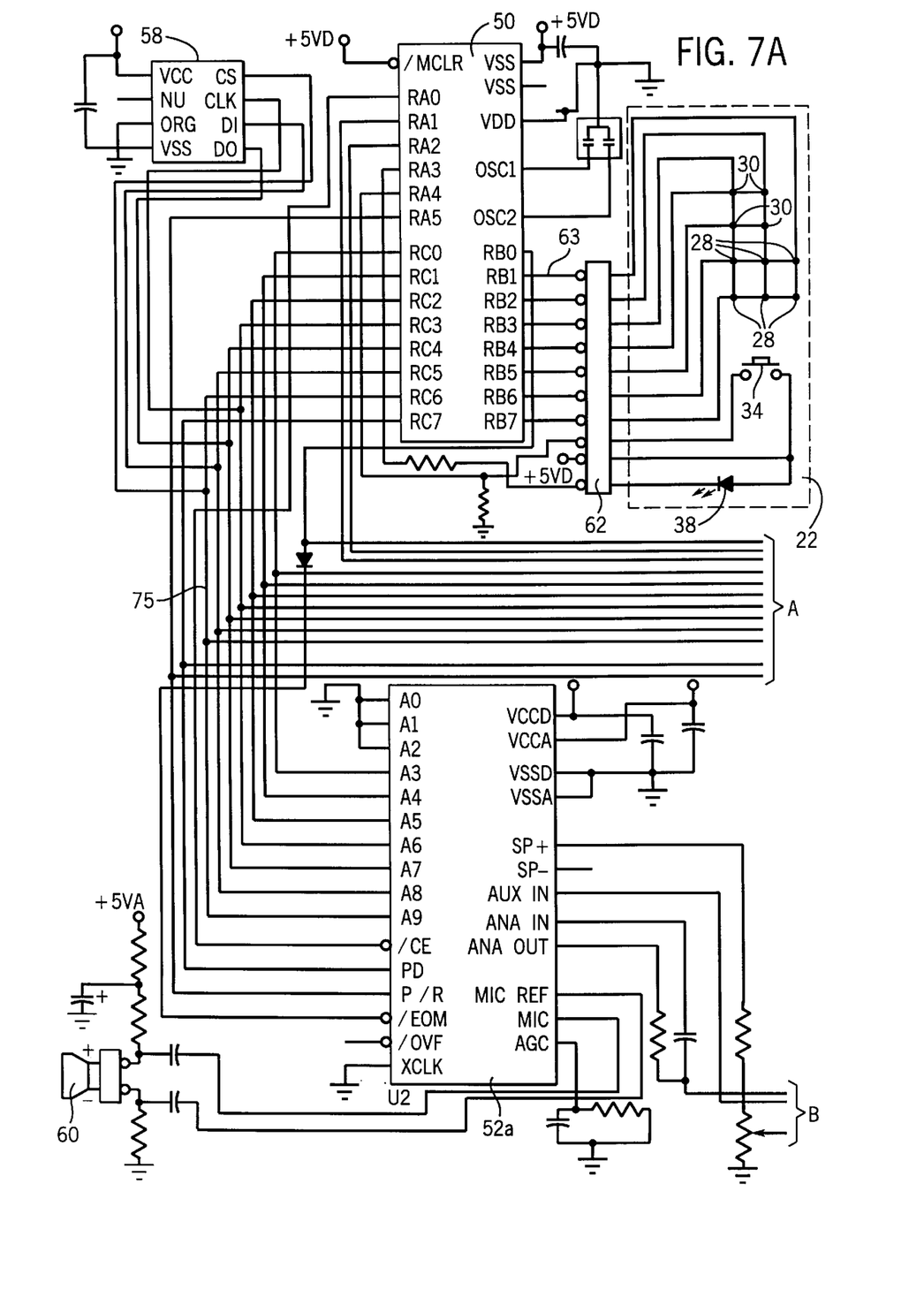
FIG. 7A is a detailed circuit diagram showing the electronic components of the communication aid of the invention.
Figure 7B:
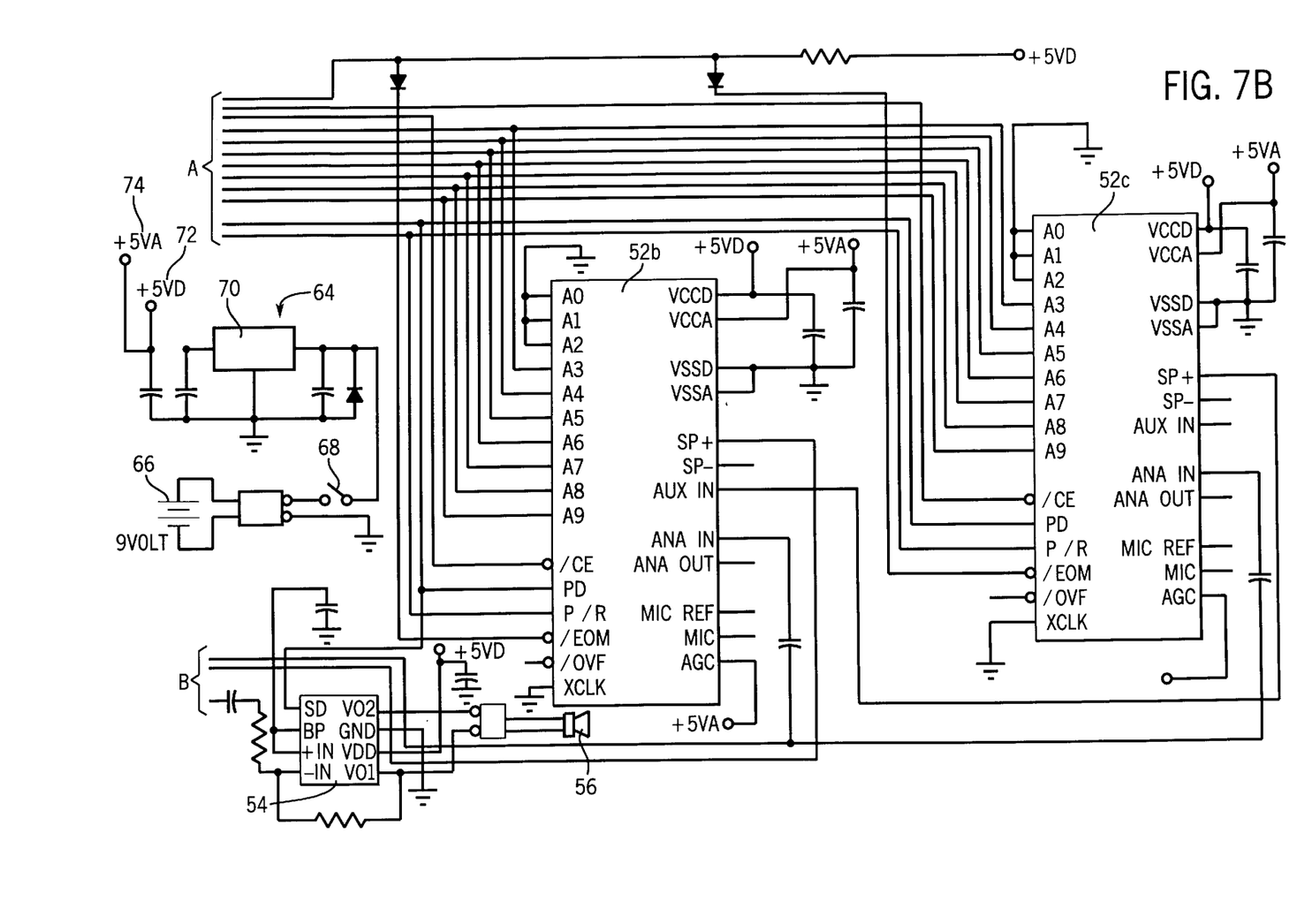
FIG. 7B is a detailed circuit diagram showing the electronic components of the communication aid of the invention.

Referring now to FIGS. 7A and 7B, thereshown is the detailed circuit diagram for the electronic controls which operate the communication aid 10. The central component of the electronic controls is the microprocessor 50 which contains the internal programming for operating the communication aid 10. In the preferred embodiment of the invention, the microprocessor 50 is a commercially available component, such as Model No. PIC16C62A sold by Microchip. The factory designated pin designations for microprocessor 50 are shown to facilitate understanding. Connected to the input pins of the microprocessor 50 is the switch membrane 22 contained in the touch pad 16. As previously discussed, the switch membrane 22 is divided into discrete activation switches 28 and mode selection switches 30, which are graphically depicted in FIG. 7A. Also contained on the switch membrane 22 are the record button 34 and the indicator light 38. The switch membrane 22 is connected to the microprocessor 50 through an interface plug 62. When one of the series of switches 28 and 30 is depressed, an electric signal is sent through one of the control lines 63 to an input pin on the microprocessor 50.

A voltage supply circuit 64 is shown in FIG. 7B. The voltage supply circuit 64 is connected to a source of DC power, such as a 9-volt battery 66. The battery 66 is connected through on-off switch 68 to a conventional voltage regulator 70. In the preferred embodiment of the invention, the voltage regulator 70 is a standard component having Model No. LM7805. The voltage regulator 70 outputs a pair of voltages 72 and 74 which are used to provide power to the remaining components shown in FIGS. 7A and 7B.

Microprocessor 50 is also connected through control lines 75 to a series of memory devices, such as sound chips 52a–c, which record the series of sound messages to be replayed in the manner to be discussed below. Preferably, each of the sound chips 52a–c is configured to record nine separate 10 second sound messages for a total of 90 seconds of recording time. In the preferred embodiment of the invention, the sound chips 52a–c are commercially available components such as Model No. ISD2590 from ISD. The external factory selected pin designations for each of the sound chips 52a–c are shown in FIGS. 7A and 7B to more fully facilitate understanding of the invention. The combination of the three sound chips 52a–c shown in FIGS. 7A and 7B can record approximately 270 second of combined sound messages. The control lines 75 between the microprocessor 50 and the sound chips 52a–c allow the microprocessor 50 to control both the recording and playback of sound messages into and out of each of the sound chips 52a–c in a conventional manner.

EEPROM 58 is also connected to the control lines 75 between the microprocessor 50 and the sound chips 52a–c. The EEPROM 58 stores the sound data contained in each of the sound chips 52a–c when power is disconnected from the microprocessor 50 and the sound chips 52a–c through on-off switch 68. In the embodiment shown in FIGS. 7A and 7B, the EEPROM 58 is a commercial available component such as Model No. 93AA46 sold by Microchip. Thus, when the communication aid 10 is turned off, the presently stored sound messages in the sound chips 52a–c are stored in the EEPROM 58 such that upon turning the communication aid 10 back on, the previously stored sound messages are still available.

Each of the sound chips 52a–c are connected through the audio amplifier 54 to the loudspeaker 56. The sound messages recorded in each of the sound chips 52a–c can thus be replayed through the speaker 56.

Microphone 60 is connected to sound chip 52a and is linked to the remaining sound chips 52b and 52c by interconnecting the auxiliary outputs of each sound chip 52a–c. Upon depressing the record button 34, a sound message can be recorded in one of the sound chips 52a–c at a location having an address assigned by the microprocessor 50 corresponding to the mode selection switch 30 and activation switches 28 depressed.

The operation of the communication aid 10 will now be described in detail. Initially, one of the overlay sheets 26 or 46 is inserted into the pocket between the cover sheet 20 and switch membrane 22 on the touch pad 16 securely mounted to the console 12. With the overlay sheet 26 or 46 in place, a sound message is then recorded for each of the message symbols 42 aligned with the activation switch areas 28.

To record a message, the first step is to select one of the four categories of needs by depressing one of the mode selection switches 30. When the simple overlay sheet 26 shown in FIG. 4 is used, the mode selection switch 30 beneath the mode symbol 44a is depressed to select the category of need shown, and then released.

After selecting the correct category, the assistant to the disabled person then depresses and holds the record button 34 while pressing one of the message symbols 42, and hence the corresponding activation switch 28 located therebelow. While depressing the record button 34 and one of the activation switches 28, the microprocessor 50 identifies a memory location in one of the sound chips 52a–c based on the combination of the mode selection switch 30 and activation switch 28. While the activation switch 28 and record button 34 are being depressed, the assistant speaks into microphone 60 and states the desired message which corresponds to the message symbol 42 being depressed. For example, when depressing the message symbol 42e showing the "Zoo", the user may state "I want to go to the zoo". This sound message is then stored in a memory location in one of the sound chips 52a–c. The sound message has an address corresponding to the combination of the mode selection switch 30 and activation switch 28 which were depressed before recording the sound message.

During recording of the sound message, the indicator light 38 is turned on by the microprocessor 50 in order to indicate that recording is taking place.

After recording a sound message for the message symbol 42e, the assistant repeats the preceding steps until a sound message has been recorded for each message symbol corresponding to the particular mode selection switch 30 depressed. For example, when using the overlay sheet 26 shown in FIG. 4, a sound message is recorded for each of the various symbols 42a–f shown for the category of transportation related needs.

After all the sound messages have been recorded for a particular category of needs represented by a mode symbol 44, a new overlay sheet 26 is placed in the pocket between the cover sheet 20 and switch membrane 22. Next, the mode symbol 44 and underlying mode selection switch 30 are depressed to specify that the upcoming sound messages are now going to be recorded for a second category of needs. Again, the record button 34 and specific message symbol 42 and underlying activation switch 28 are depressed while a sound message is recorded in one of the sound chips 52a–c having an address assigned by the microprocessor 50.

In the preferred embodiment of the invention shown in the figures, a total of twenty-four messages in four separate categories of needs can be recorded. Each of the sound messages can be up to a ten second recording, for a total of approximately four minutes of total recording time.

When using the complex overlay sheet 46 shown in FIG. 5, the preceding steps are followed, wherein the mode selection switch 30 is first depressed before recording a sound message for each of the six individual message symbols 42. Thus, the four categories of need are represented by mode symbols 44a–d on the single complex overlay sheet 46.

Once the series of sound messages have been recorded for each message symbol 42 in each category of needs, the communication aid 10 can be used to communicate and playback the pre-recorded messages. To playback a message, the user first depresses the mode symbol 44 and underlying mode selection switch 30 corresponding to the category of need the user wishes to express. For example, if the user wishes to express a need related to transportation, the user depresses the mode symbol 44*a* showing the automobile, as shown in FIG. 4. After selecting the category of need, the user can depress any one of the six message symbols 42*a–f* and underlying activation switch 28.

Upon depressing one of the message symbols 42, the aligned activation switch 28 contained in the switch membrane 22 sends an electric signal through interface plug 62 to microprocessor 50. Upon receiving the electronic signal from the switch membrane 22, microprocessor 50 causes one of the sound chips 52*a–c* to play the message corresponding to the address identified by the particular mode selection switch 30 and activation switch 28 depressed. The sound chip 52*a–c* corresponding to the address from the microprocessor 50 sends the prerecorded sound message to amplifier 54 and finally to speaker 56. Speaker 56 communicates through the perforations 40 contained in the touch pad 16 such that the sound message can be heard by those in the near vicinity to the communication aid 10. In this manner, the user can express a particular message to those around him or her.

If the user wishes to switch the category of needs, the overlay sheet 26 can be removed and a new overlay sheet corresponding to a different category of needs can be inserted. With the new overlay sheet 26 in place, the user again depresses the mode symbol 44 shown on the overlay sheet 26, which causes the underlying mode selection switch 30 to send an electronic signal to the microprocessor 50. The user can then depress one of the message symbols 42 corresponding to their desired need. Upon depressing the message symbol 42, the activation switch 28 lying below the message symbol 42 sends an electronic signal to the microprocessor 50. Upon receiving the two-part electronic signal from the switch membrane 22, the microprocessor 50 addresses a memory location in one of the sound chips 52*a–c*, causing the addressed sound chip 52*a–c* to output the proper sound message to speaker 56. In this manner, the user can play twenty-four separate messages based on the order in which the mode symbols 44 and message symbols 42 are depressed.

As previously discussed, the complex overlay sheet 46 incorporates the four mode symbols 44*a–d* and twenty-four message symbols 42*a–x* into a single sheet. The communication aid 10 operates in the same manner when using the complex overlay sheet 46, as previously discussed.

If the user wishes to clear any of the sound messages recorded corresponding to one of the message symbols 42*a–x*, the user first presses the appropriate mode symbol 44. The mode selection switch 30 lying below the mode symbol 44 sends a message to the microprocessor. Next, the user holds down the record button 34 and depresses the message symbol 42 which they wish to erase. After depressing the message symbol 42, the user instantly releases the message symbol, thereby causing the microprocessor 50 to erase the memory location having an address corresponding to the mode symbol 44 and message symbol 42 depressed.

In the preferred embodiment of the invention, the complex overlay sheet 46, shown in FIG. 5, can be color coded to further facilitate understanding of the manner of operation. As previously discussed, an identification bar 48 is placed above each of the mode symbols 44*a–d*. Each of the identification bars 48 is a different color in order to facilitate the separation between each of the categories of need. Along with the identification bar 48 above the mode symbols 44*a–d*, the message symbols 42 corresponding to each mode symbols 44 can be color coded in a color corresponding to the identification bar 48 above the mode symbol 44, such as by applying a colored dot 48*a* adjacent the message symbol. In this manner, the user can identify which message symbol 42 is associated with each of the mode symbols 44.

Although the preferred embodiment of the communication aid 10 has been shown and described in FIGS. 1–7B as having four categories of needs and six potential messages for each category, it is understood that different combinations of the number of categories and messages for each category can be substituted while still falling within the scope of the present invention.

Various modes of carrying out the invention are contemplated as being within the scope of the following claims which particularly point out and distinctly claim the subject matter which is regarded as the invention.

We claim:

1. A communication aid for a handicapped patient comprising:

a case having a flat support surface;

a touch pad securely mounted to the case above the support surface, the touch pad having a switch membrane, the switch membrane being divided into a plurality of mode selection switches and a plurality of activation switches;

at least one mode symbol arranged to correspond to one of the mode selection switches, the mode symbol illustrating a category of need;

a plurality of message symbols each representing a need of a person, said message symbols being arranged to correspond in location to the activation switches on the touch pad;

a record button contained on the touch pad, the record button being depressible to record a sound message that corresponds to one of the message symbols;

a memory device for storing a plurality of the sound messages, each sound message recorded to correspond to one of the message symbols and having an address defined by a combination of one of the mode selection switches and the activation switch corresponding in location to the message symbol such that a sound message is stored in the memory device for each combination of the mode selection switches and the activation switches;

a sound generating device for generating the sound message associated with the combination of one of the mode selection switches and one of the activation switches when the mode symbol and the message symbol on the touch pad are depressed.

2. The communication aid of claim 1 further comprising an overlay sheet being removably mounted to the touch pad, the overlay sheet including the mode symbols and the message symbols, such that the message symbols contained on the overlay sheet correspond in location to the activation switches and the mode symbols contained on the overlay sheet correspond in location to the mode switches when the overlay sheet is mounted to the touch pad.

3. The communication aid of claim 2 wherein the overlay sheet includes a single mode symbol and a plurality of message symbols, the mode symbol corresponding in location to one of the mode switches on the touch pad and the plurality of message symbols corresponding in location to the plurality of activation switches on the touch pad.

4. The communication aid of claim 2, wherein the overlay sheet includes a plurality of mode symbols and a plurality of groups of message symbols, each group of message symbols corresponding to one of said mode symbols.

5. The communication aid of claim 2, further comprising a microprocessor controller for assigning the address to each sound message, the address identifying the storage location of the sound message in the memory device, an address being assigned to each combination of the mode selection switches and activation switches such that the microprocessor controller controls the generation of the sound message when an activation switch is depressed.

6. The communication aid of claim 2, further comprising a first colored zone positioned adjacent each of the mode symbols, and a second colored zone positioned in each message symbol corresponding to the respective mode symbol, said first and second colored zones being the same color.

7. The communication aid of claim 1 wherein the touch pad includes four mode selection switches and six activation switches.

8. The communication aid of claim 1 wherein the sound generating device includes a speaker mounted to project sound outward from the flat support surface on the cabinet.

9. The communication aid of claim 1 further comprising an indicator light connected to the touch pad, the indicator light indicating that one of the sound messages is being recorded in the memory device.

10. The communication aid of claim 1 further comprising a memory storage unit that stores the plurality of sound messages such that upon power loss to the communication aid, the sound messages are stored in the memory storage unit.

11. A communication aid for a handicapped patient, the communication aid comprising:

a case having a support surface;

a touch pad securely mounted to the case above the support surface, the touch pad having a switch membrane, the switch membrane being divided into a plurality of mode selection switches and a plurality of activation switches;

an overlay sheet being removably mounted to the touch pad, the overlay sheet having at least one mode symbol illustrating a general category of need and a plurality of message symbols each illustrating a specific need falling within the category, the message symbols corresponding in location to the activation switches and the mode symbol corresponding in location to one of the mode selection switches when the overlay sheet is mounted to the touch pad;

a record button contained on the touch Dad, the record button being depressible to record a sound message spoken into a microphone;

a memory device for storing a plurality of the recorded sound messages, each sound message recorded to correspond to one of the message symbols on the overlay sheet and having an address defined by a combination of one of the mode selection switches and the activation switch corresponding in location to the message symbol, such that the recorded sound messages are stored in the memory device for each combination of the mode selection switches and the activation switches;

a microprocessor controller for assigning the address for the location of each sound message in the memory device; and a sound generating device for generating the recorded sound message associated with the combination of one of the mode selection switches and one of the activation switches on the switch membrane, such that when one of the mode selection switches and one of the activation switches are sequentially depressed, the microprocessor generates the recorded sound message having the address corresponding to the combination of the mode selection switch and activation switch depressed.

12. The communication aid of claim 11 wherein the overlay sheet includes a single mode symbol and a plurality of message symbols.

13. The communication aid of claim 11 wherein the overlay sheet includes a plurality of mode symbols and a plurality of groups of message symbols, each group of message symbols corresponding to one of said mode symbols.

14. The communication aid of claim 13, wherein each mode symbol has a color different from the color of the other mode symbols, and each message symbol of each group has a color different from the color of the other message symbols of that group and corresponding to the color of one of said mode symbols.

15. A method of communication for a handicapped patient, the method comprising the steps of:

providing a touch pad including a switch membrane;

dividing the switch membrane into a plurality of mode selection switches and a plurality of activation switches, each switch generating an electric signal upon being depressed;

providing an overlay sheet having at least one mode symbol, each mode symbol representing a category of need, and a plurality of message symbols;

removably mounting the overlay sheet to the touch pad such that the mode symbol on the overlay sheet corresponds in location to one of the mode selection switches on the switch membrane and the message symbols correspond in location to the activation switches;

recording and storing a plurality of sound messages in a memory device, each sound message being related to a message symbol on the overlay sheet, each sound message having an address corresponding to the combination of one mode selection switch and one activation switch;

depressing one of the mode symbols on the overlay sheet and the corresponding mode selection switch on the switch membrane to select the category of need represented by the mode symbol;

depressing one of the message symbols on the overlay sheet and the corresponding activation switch on the switch membrane for the specific need;

accessing the sound message having the address corresponding to mode selection switch and activation switch depressed; and replaying the recorded sound message for the message symbol depressed on the overlay sheet, such that the sound message communicates the message symbol being depressed.

16. The method of claim 15 wherein the plurality of symbols on the overlay sheet include at least one mode symbol representing a general category of need and a plurality of message symbols each representing a specific need falling within said category, the mode symbols corresponding in location to the mode selection switches and the message symbols corresponding in location to the activation switches.

17. The method of claim 16 wherein the step of recording the plurality of sound messages comprises:

depressing a record button contained on the touch pad;

depressing the mode symbol and the underlying mode selection switch to specify a category of needs;

depressing one of the message symbols and the underlying activation switch for which a sound message is to be recorded; and recording a sound message in the memory device, the sound message having an address defined by the mode selection switch and the activation switch depressed prior to recording, such that when the mode selection switch and activation switch are subsequently depressed, the recorded sound message will be replayed.

18. The method of claim 15 further comprising the step of providing a plurality of overlay sheets, each overlay sheet having a single mode symbol and a plurality of message symbols such that a separate overlay sheet is provided for each mode selection switch.

19. The method of claim 17 wherein the overlay sheet has a plurality of mode symbols and a plurality of groups of message symbols, each group of message symbols corresponding to one of said mode symbols, and replaying a message symbols, such that each mode symbol has six corresponding message symbols such that to replay the sound message corresponding to a particular message symbol by depressing the mode symbol.

20. A communication aid for a handicapped patient comprising:

a case having a flat support surface;

a touch pad securely mounted to the case above the support surface, the touch pad having a switch membrane, the switch membrane being divided into a plurality of mode selection switches and a plurality of activation switches;

an overlay sheet being removably mounted to the touch pad, the overlay sheet having a plurality of mode symbols each illustrating a different category of need and a plurality of groups of message symbols, the symbols corresponding in location to the mode selection switches, each message symbol within a group representing a specific need falling within the category identified by one of the mode symbols, the groups of message symbols being arranged such that the message symbols from each group each corresponds in location to one of the activation switches, such that multiple message symbols correspond in location to each of the activation switches;

a memory device for storing a plurality of sound messages, each sound message corresponding to one of the message symbols on the overlay sheet and having an address defined by a combination of one of the mode selection switches and the activation switch corresponding in location to the message symbol such that a sound message is stored in the memory device for each combination of the mode selection switches and the activation switches;

a control unit for assigning the address for the location of each sound message in the memory device; and a sound generating device for generating the sound message associated with the depressed combination of one of the mode selection switches and one of the activation switches on the switch membrane, such that when one of the mode selection switches and one of the activation switches are sequentially depressed, the control unit generates the sound message having the address corresponding to the combination of the mode selection switch and the activation switch depressed.

* * * * *

UNITED STATES PATENT AND TRADEMARK OFFICE
CERTIFICATE OF CORRECTION

PATENT NO. : 5,910,009
DATED : June 8, 1999
INVENTOR(S) : Ruth B. Leff et al

It is certified that error appears in the above-indentified patent and that said Letters Patent is hereby corrected as shown below:

In the Claims:

Col. 11, line 49, CLAIM 11, Cancel "Dad" and substitute therefor --pad--

Signed and Sealed this

Ninth Day of November, 1999

Attest:

Attesting Officer

Q. TODD DICKINSON

Acting Commissioner of Patents and Trademarks